United States Patent
Kaihotsu

(10) Patent No.: US 9,363,407 B2
(45) Date of Patent: Jun. 7, 2016

(54) IMAGE SENSOR UNIT AND IMAGE READING APPARATUS

(71) Applicant: CANON COMPONENTS, INC., Kodama-gun, Saitama (JP)

(72) Inventor: Takahiro Kaihotsu, Saitama (JP)

(73) Assignee: CANON COMPONENTS, INC., Saitama (JP)

(*) Notice: Subject to any disclaimer, the term of this patent is extended or adjusted under 35 U.S.C. 154(b) by 0 days.

(21) Appl. No.: 14/105,578

(22) Filed: Dec. 13, 2013

(65) Prior Publication Data
US 2014/0185110 A1 Jul. 3, 2014

(30) Foreign Application Priority Data

Dec. 28, 2012 (JP) ................................. 2012-287887

(51) Int. Cl.
*H04N 1/04* (2006.01)
*H04N 1/193* (2006.01)

(52) U.S. Cl.
CPC .................................. *H04N 1/1934* (2013.01)

(58) Field of Classification Search
CPC .................................................. H04N 1/1934
USPC ........................................................ 358/482
See application file for complete search history.

(56) References Cited

U.S. PATENT DOCUMENTS

| 2002/0044699 | A1* | 4/2002 | Kozuka | 382/312 |
| 2005/0270590 | A1* | 12/2005 | Izumi et al. | 358/474 |
| 2008/0209292 | A1* | 8/2008 | Yokota | 714/733 |
| 2011/0194005 | A1* | 8/2011 | Koizumi et al. | 348/300 |

FOREIGN PATENT DOCUMENTS

| JP | 62-193353 A | 8/1987 |
| JP | 01-252060 A | 10/1989 |
| JP | 05-003546 A | 1/1993 |
| JP | 09-205518 A | 8/1997 |
| JP | 2001-028672 A | 1/2001 |
| JP | 2006-166349 A | 6/2006 |

OTHER PUBLICATIONS

Office Action issued in corresponding Japanese Patent Application No. 2012-287887, dated Jan. 6, 2015.

* cited by examiner

*Primary Examiner* — Marivelisse Santiago Cordero
*Assistant Examiner* — Kevin Ky
(74) *Attorney, Agent, or Firm* — Rossi, Kimms & McDowell LLP

(57) ABSTRACT

In an image sensor unit including a plurality of sensor chips mounted in a line on a sensor substrate, image signals from the sensor chips are sequentially read according to a reading order among the sensor chips, a current consumption circuit that consumes set current is arranged, and the current consumption circuit starts consuming the set current in response to a signal indicating end of reading of the image signals by all of the sensor chips and ends consuming the set current in response to a signal indicating start of reading of the image signals first by the sensor chip after a start signal to thereby reduce variation in the current consumption of the image sensor unit.

14 Claims, 9 Drawing Sheets

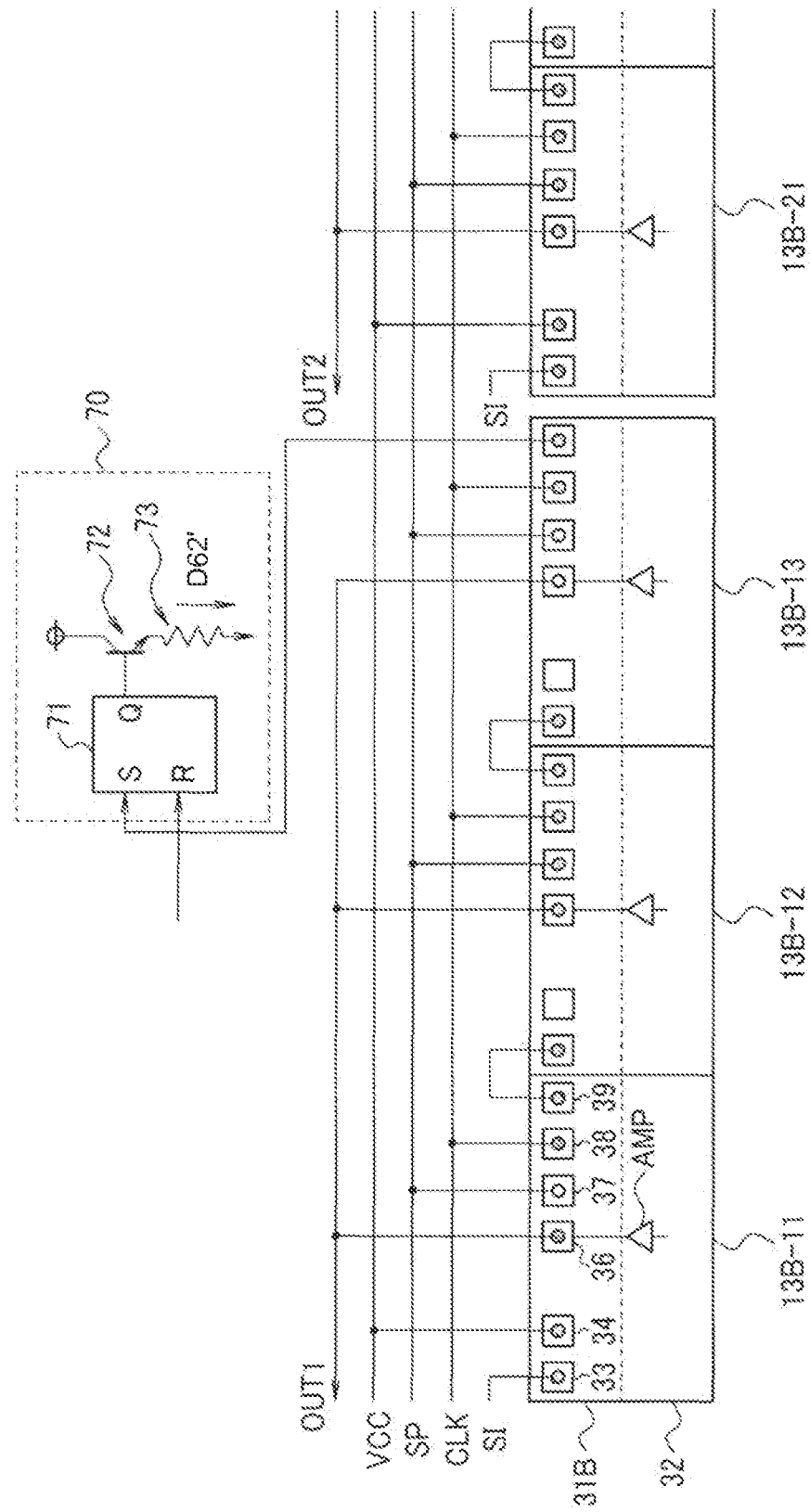

(12)  United States Patent US 9,363,407 B2

IMAGE SENSOR UNIT AND IMAGE READING APPARATUS

CROSS-REFERENCE TO RELATED APPLICATIONS

This application is based upon and claims the benefit of priority of the prior Japanese Patent Application No. 2012-287887, filed on Dec. 28, 2012, the entire contents of which are incorporated herein by reference.

BACKGROUND OF THE INVENTION

1. Field of the Invention

The present invention relates to an image sensor unit and an image reading apparatus.

2. Description of the Related Art

Examples of known image reading apparatuses include a copying machine, an image scanner, and a facsimile. Contact image sensor (CIS) units that optically read image information of originals to convert the image information to electric signals are used in the image reading apparatuses. Unlike a line sensor using a conventional reduction optical system that uses an optical system to reduce and read an image, a multi-chip image sensor including a plurality of sensor chips mounted in a line on the same substrate is used in the contact image sensor unit.

In general, sensor chips mounted on an image sensor unit are divided into a plurality of groups, and image signals are concurrently read in the groups. Each sensor chip includes a signal output amplifier of an output stage that amplifies and outputs an image signal to a common output line connected outside of the chip. The current consumption of the signal output amplifier is high. To reduce the current consumption of the image sensor unit, ON/OFF of the signal output amplifier is controlled in each sensor chip according to the operation state. Specifically, power supply to the signal output amplifier is started when reading operation is started in the sensor chip, and the power supply to the signal output amplifier is cut off when the reading operation is finished.

For example, in a period (blank period) after the end of the reading operation by all sensor chips mounted on the image sensor unit, circuits related to image signal output including the signal output amplifiers are turned off in all sensor chips, and the current consumption in the period is low. When a start pulse for starting the operation of the next line is input, all sensor chips perform vertical transfer operation, and the current consumption of the image sensor unit increases according to the total number of sensor chips. When the reading of the image signals from the sensor chips is started, the signal output amplifiers of the sensor chips that read the image signals are turned on, and the current according to the number of sensor chips that read the image signals.

Although an attempt is made to reduce the current consumption of the image sensor unit by controlling ON/OFF of the signal output amplifiers of the sensor chips, this increases the variation in the load. For example, before and after the blank period after the end of the reading operation in the sensor chips, the sensor chips that have been reading the image signals change from an ON-state to an OFF-state. The current consumption decreases according to the number of sensor chips that change from the ON-state to the OFF-state, and the current consumption of the image sensor unit significantly varies. The number of sensor chips that operate at the same time increases with an increase in the output of the image sensor unit, and the variation in the current consumption of the image sensor unit is large. The variation in the current consumption of the image sensor unit leads to variation in the power supply voltage supplied to the sensor chips and the like, and this causes variation in the output.

Japanese Laid-open Patent Publication No. 2006-166349 discloses an image forming apparatus including a filter on a power line from a power part to an original reading part and to an image processing part, and the filter removes variation in the power supply voltage caused by current variation in an original reading system to reduce the effect on an image writing part. A specific configuration is disclosed, in which a capacitor is placed on a power line from a power part to an original reading part and to an image processing part, and the current variation that occurs in an original reading system is charged and discharged to and from the capacitor to reduce the current variation on the power part side to reduce the variation in the power supply voltage.

SUMMARY OF THE INVENTION

An object of the present invention is to reduce variation in current consumption of an image sensor unit by controlling ON/OFF of circuits related to signal output in the image sensor unit that controls ON/OFF of the circuits related to the signal output according to an operation state of sensor chips.

The present invention provides an image sensor unit comprising a plurality of sensor chips mounted in a line on a same substrate, each of the sensor chips including: a plurality of photoelectric conversion elements that convert reflected light from an imaged illuminated object to electric signals; a memory part that holds image signals obtained from photoelectric conversion by the photoelectric conversion elements; a signal output part that outputs the image signals sequentially read from the memory part to an external output line, wherein ON/OFF of the signal output part is controlled according to an operation state of the sensor chip; and a current consumption circuit that consumes set current in a predetermined period. The current consumption circuit starts consuming the set current in response to a signal indicating end of reading of the image signals by all of the sensor chips and ends consuming the set current in response to a signal indicating start of reading of the image signals first by the sensor chip after a start signal.

BRIEF DESCRIPTION OF THE DRAWINGS

FIG. 8 is a view illustrating an example of sensor chips and a current consumption circuit mounted on a sensor substrate according to a second embodiment of the present invention.

DETAILED DESCRIPTION OF THE PREFERRED EMBODIMENTS

Figure 1:
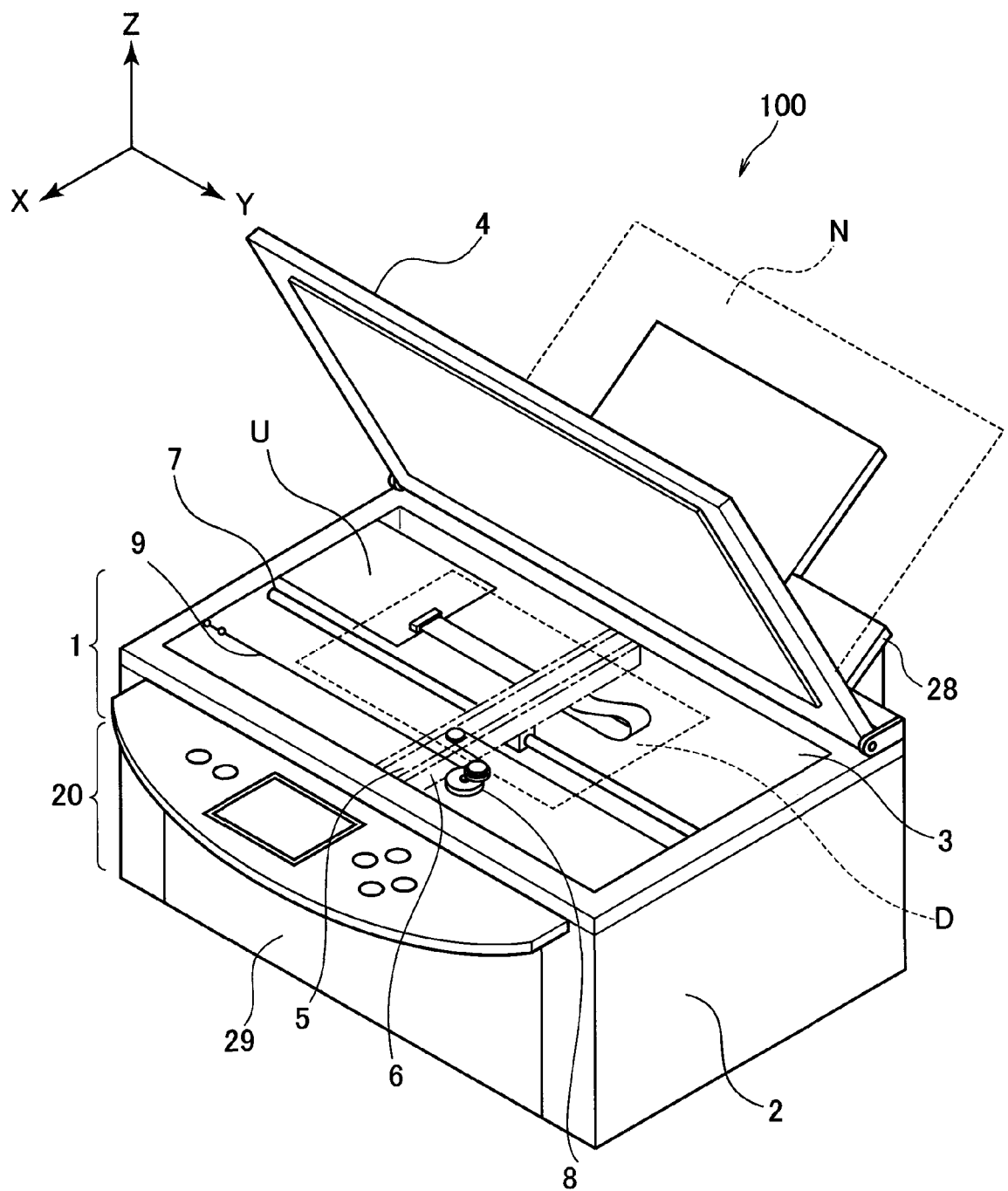
FIG. 1 is a perspective view illustrating an appearance of an MFP (Multi Function Printer) including an image sensor unit according to embodiments of the present invention.

Hereinafter, embodiments of the present invention will be described in detail with reference to the drawings.

In the embodiments, an image sensor unit described later as well as an image reading apparatus and an image forming apparatus to which the image sensor unit is applied will be described. In the drawings described below, three-dimensional directions are indicated by X, Y, and Z arrows, as necessary. The X direction denotes a main-scan direction, the Y direction denotes a sub-scan direction perpendicular to the main-scan direction, and the Z direction denotes a vertical direction.

In the image reading apparatus and the image forming apparatus, an image sensor unit emits light to an original D as an object to be read and converts reflected light to an electric signal to read an image (reflection reading). The object to be read is not limited to the original D, and other objects to be read can also be applied. Not only the reflection reading, but also transmission reading may be applied.

A structure of a Multi Function Printer (MFP) as an example of the image reading apparatus or the image forming apparatus to which the image sensor unit according to the embodiments can be applied will be described with reference to FIG. 1. FIG. 1 is a perspective view illustrating an appearance of the MFP. As illustrated in FIG. 1, an MFP 100 includes: an image reading part 1 that reads reflected light from the original D as an illuminated object; and an image forming part 20 that forms (prints) an image of the original D on a sheet N (recording paper) as a recording medium.

The image reading part 1 has functions of a so-called image scanner. The image reading part 1 includes, for example: a housing 2; a platen glass 3 made of a glass transparent plate as an original placing part; and a platen cover 4 that can be freely opened and closed relative to the housing 2 so as to cover the original D. The housing 2 houses an image sensor unit 5, a holding member 6, an image sensor unit slide shaft 7, an image sensor unit drive motor 8, a wire 9, a signal processing part U, and the like.

The image sensor unit 5 is, for example, a contact image sensor (CIS) unit. The image sensor unit 5 optically reads image information of the original D as an illuminated object placed on the platen glass 3 and converts the image information to an electric signal. The holding member 6 surrounds and holds the image sensor unit 5. The image sensor unit slide shaft 7 guides the holding member 6 in a sub-scan direction along the platen glass 3. The image sensor unit drive motor 8 moves the wire 9 attached to the holding member 6.

In the image reading part 1 with the configuration, the image sensor unit drive motor 8 moves the image sensor unit 5 held by the holding member 6 in a reading direction (sub-scan direction) along the image sensor unit slide shaft 7. In this case, the image sensor unit 5 optically reads the original D placed on the platen glass 3 and converts the original D to an electric signal to perform image reading operation.

Figure 2:
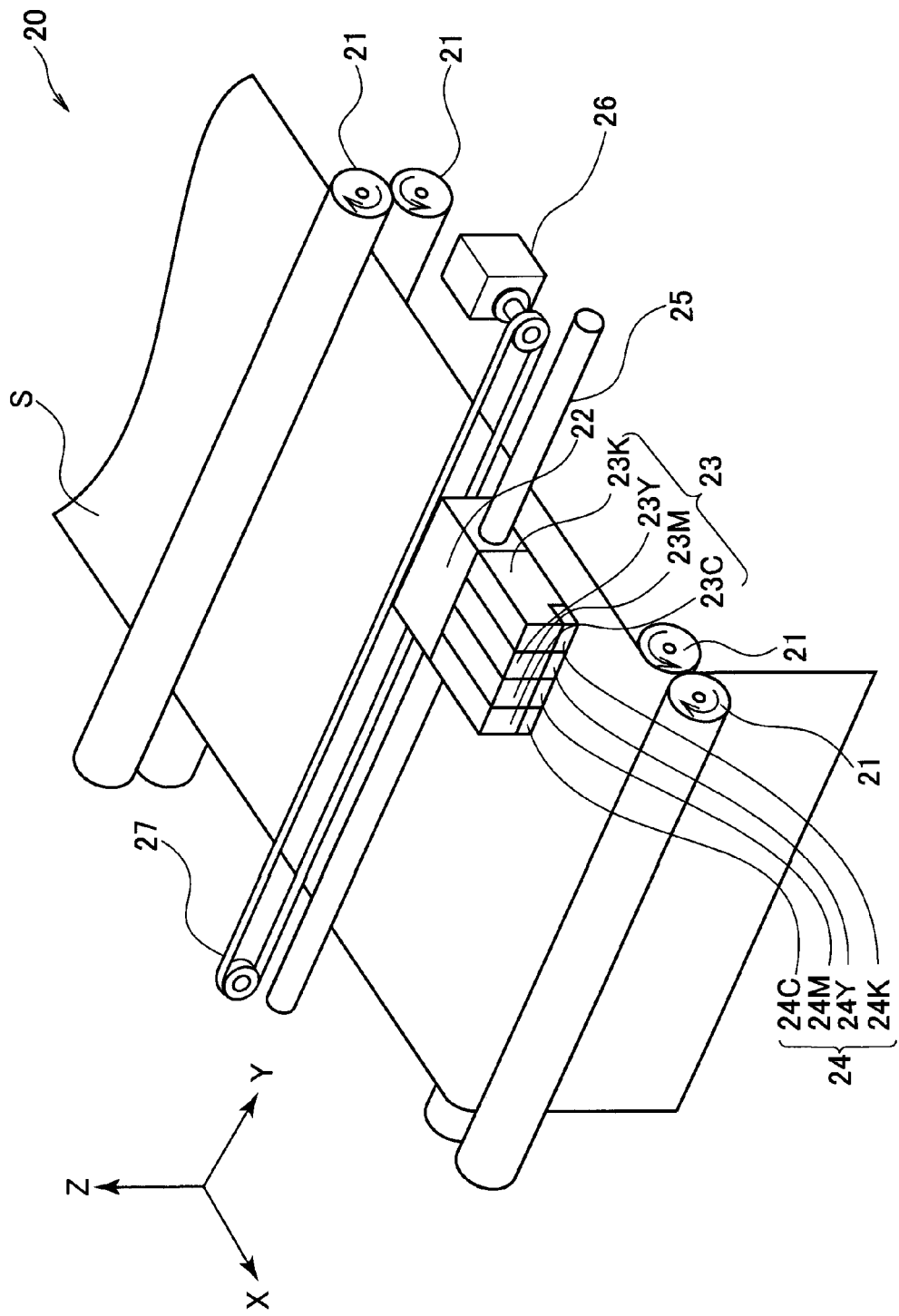
FIG. 2 is a schematic view illustrating a structure of an image forming part in the MFP according to the embodiments of the present invention.

FIG. 2 is a schematic view illustrating a structure of the image forming part 20. The image forming part 20 has functions of a so-called printer. The image forming part 20 is housed in the housing 2 and includes conveyance rolls 21 and a recording head 22 as illustrated in FIG. 2, for example. The recording head 22 includes, for example: ink tanks 23 (23C, 23M, 23Y, and 23K) including cyan C, magenta M, yellow Y, and black K inks; and discharge heads 24 (24C, 24M, 24Y, and 24K) arranged on the ink tanks 23. The image forming part 20 further includes a recording head slide shaft 25, a recording head drive motor 26, and a belt 27 attached to the recording head 22.

A paper feeding tray 28 is arranged on a back surface of the housing 2, and a recovery unit 29 is arranged on a front surface of the housing 2 (see FIG. 1). The paper feeding tray 28 houses a sheet N of a predetermined size. The recovery unit 29, which can be freely opened and closed relative to the housing 2, recovers the printed sheet N.

In the image forming part 20 with the configuration, the conveyance rolls 21 convey the sheet N supplied from the paper feeding tray 28 to a recording position. The recording head drive motor 26 mechanically moves the belt 27, and the recording head 22 moves in the printing direction (main-scan direction) along the recording head slide shaft 25 to print the image on the sheet N based on an electric signal. After repeating the operation until the end of printing, the conveyance rolls 21 eject the printed sheet N to the recovery unit 29. Although an inkjet-type image forming apparatus has been described as the image forming part 20, the type can be any type, such as an electrophotographic type, a thermal transfer type, and a dot impact type.

Figure 3:
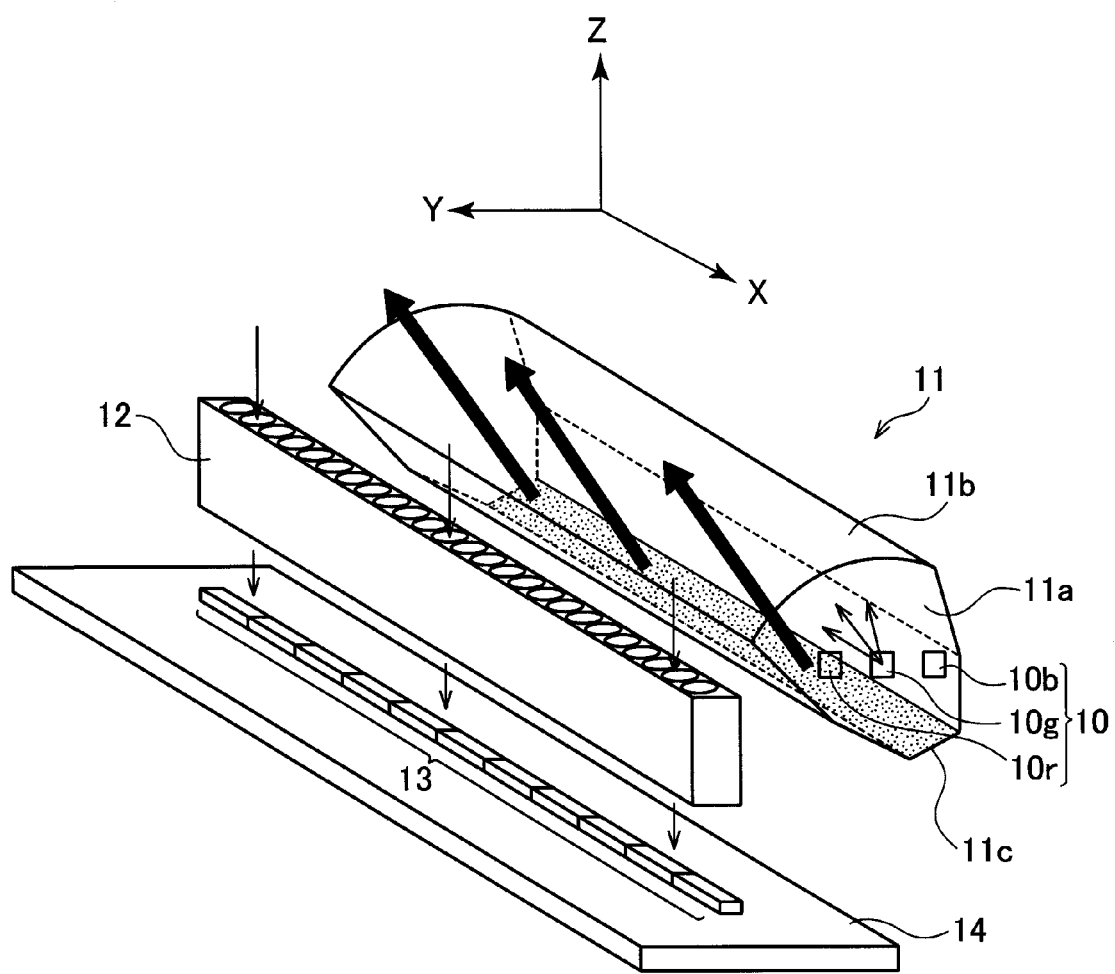
FIG. 3 is a schematic diagram illustrating an example of a configuration in the image sensor unit according to the embodiments of the present invention.

A relationship between components in the image sensor unit 5 and an optical path from a light source 10 will be described with reference to FIG. 3. FIG. 3 is a schematic diagram illustrating an example of a configuration in the image sensor unit 5. The image sensor unit 5 includes therein the light source 10, a light guide 11, a rod-lens array 12, and a sensor substrate 14.

The light source 10 illuminates the original D and includes light emitting elements 10r, 10g, and 10b with emission wavelengths of three colors of red, green, and blue, for example. The light source 10 sequentially activates the light emitting elements 10r, 10g, and 10b to emit light.

The light guide 11 guides the light emitted from the light source 10 to the original D placed on the platen glass 3 and has an elongated shape in a length corresponding to the width of the original D. The light guide 11 is formed by transparent plastic, such as an acrylic resin and polycarbonate. An end face on one side of the light guide 11 in the longitudinal direction (main-scan direction) is a light entering surface 11a from which the light from the light source 10 enters. In the image sensor unit 5, the light emitting elements 10r, 10g, and 10b of the light source 10 are arranged to face the light entering surface 11a to efficiently guide the light from the light source 10 to enter the light guide 11. A surface in the longitudinal direction of the light guide 11 facing the original D on the platen glass 3 is a light exiting surface 11b from which the light entered into the light guide 11 exits. A surface facing the light exiting surface 11b is a diffusing surface 11c for reflecting and diffusing the light from the light entering surface 11a in the light guide 11. The areas other than the light entering surface 11a, the light exiting surface 11b, and the diffusing surface 11c of the light guide 11 are substantially formed as reflection surfaces.

Therefore, the light guide 11 reflects and scatters the light entered from the light entering surface 11a by the diffusing surface 11c and other reflection surfaces and causes the light to exit from the light exiting surface 11b to illuminate the original D. In this way, the light source 10 and the light guide 11 function as an illumination apparatus that illuminates the original D.

The rod-lens array 12 is an optical member including a plurality of imaging elements (rod lenses) of an erect equal magnification imaging type arranged in a line in the main-scan direction (longitudinal direction) of the light guide 11. The rod-lens array 12 focuses the light from the original D on photoelectric conversion elements of a photoelectric conversion part 13. The optical member is not limited to the rod-lens array, and optical members with various conventionally well-known light condensing functions, such as various micro-lens arrays, can be applied.

The photoelectric conversion part 13 is mounted on the sensor substrate 14. The photoelectric conversion part 13 includes a plurality of photoelectric conversion elements and receives the light focused by the rod-lens array 12 to convert the light to an electric signal. The photoelectric conversion part 13 includes a plurality of sensor chips 13A or 13B mounted in a line in the main-scan direction (longitudinal direction) of the light guide 11. The rod-lens array 12 and the photoelectric conversion elements of the photoelectric conversion part 13 are formed in a length corresponding to the width of the original D.

An outline of operation when the image reading part 1 including the image sensor unit 5 with the configuration reads the original D will be described. To read the original D, the image reading part 1 first moves the image sensor unit 5 to a reading start position of the original D. The image sensor unit 5 moved to the reading start position sequentially turns on the light emitting elements 10r, 10g, and 10b of the light source 10. The light from the light source 10 enters from the light entering surface 11a of the light guide 11 and uniformly exits from the light exiting surface 11b. The light exited from the light guide 11 is emitted to the surface of the original D in a line throughout the main-scan direction. The emitted light is reflected by the original D, and the rod-lens array 12 focuses the light on the photoelectric conversion elements of the photoelectric conversion part 13 mounted on the sensor substrate 14 (reflection reading). The photoelectric conversion elements of the photoelectric conversion part 13 convert the focused reflected light to an electric signal. The image sensor unit 5 converts all red, green, and blue reflected light, and the reading operation of one scan line in the main-scan direction is finished.

Subsequently, the image reading part 1 moves the image sensor unit 5 in the sub-scan direction for a length of one scan line. Reading operation of one scan line is performed as described above, along with the relative movement of the image sensor unit 5 in the sub-scan direction. In this way, the image sensor unit 5 repeats the movement and reading operation of one scan line while moving in the sub-scan direction to sequentially scan the entire surface of the original D, and reading of the entire surface of the original D based on the reflected light is completed. A signal processing part U applies image processing to the electric signal converted by the image sensor unit 5 as necessary, and the electric signal is stored as image data.

First Embodiment

Figure 4:
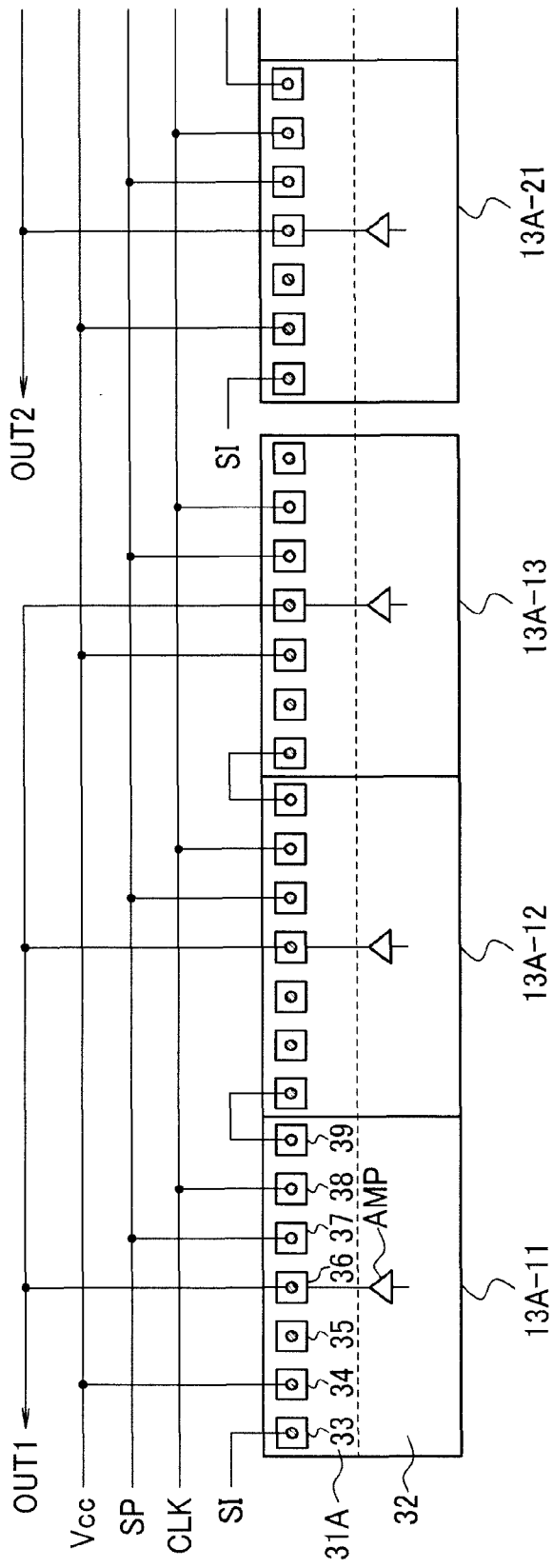
FIG. 4 is a view illustrating an example of sensor chips mounted on a sensor substrate according to a first embodiment of the present invention.

Hereinafter, the sensor chips 13A mounted on the sensor substrate 14 in a first embodiment will be described. FIG. 4 is a view illustrating an example of the sensor chips 13A mounted on the sensor substrate 14. In FIG. 4, the sensor chips 13A (13A-11, 13A-12, 13A-13, 13A-21, . . . ) are sensor chips mounted on the sensor substrate 14. Each of the sensor chips 13A includes photoelectric conversion elements. A plurality of sensor chips 13A are mounted in a line in the same direction as the longitudinal direction of the light guide 11 as described above to form the photoelectric conversion part 13.

In the first embodiment, three sensor chips 13A (for example, 13A-11, 13A-12, and 13A-13) form one set, and the plurality of mounted sensor chips 13A are grouped. Image signals are concurrently read in the groups. A sensor chip 13A-ij (i and j are suffixes) reads the image signal in an i-th group and in a j-th order. Image signal output pads of the sensor chips 13A belonging to the same group are commonly connected to one of common output lines (external output lines) outside of the sensor chips that are signal output lines for outputting the image signals.

Although three sensor chips 13A form one set in the present embodiment, the arrangement is not limited to this. The number of sensor chips 13A forming one set is arbitrary, and the number can be appropriately set according to, for example, an external interface of the image sensor unit 5 or specifications of reading time. In FIG. 4, intervals between the sensor chips 13A within the group are different from an interval between the sensor chips 13A across the groups to facilitate understanding of the grouping. However, the sensor chips 13A are mounted on the sensor substrate 14 to even out the intervals between the photoelectric conversion elements in the plurality of sensor chips 13A, whether within or across the groups.

As illustrated in FIG. 4, each sensor chip 13A includes: a pad part 31A including a plurality of pads for transmitting and receiving signals to and from the outside of the sensor chip; and a sensor part 32 that converts reflected light from the imaged original D to an electric signal to output the electric signal. The pad part 31A includes, for example, a start signal input pad 33, reading order detection pads 34 and 35, an image signal output pad 36, a start pulse input pad 37, a clock input pad 38, and a next chip start signal output pad 39.

A start signal SI for starting reading of an image signal from the sensor chip 13A, in other words, for starting shift operation of a shift register in the sensor chip 13A for sequentially reading the image signal, is input to the start signal input pad 33.

The reading order detection pads 34 and 35 are used to detect an order of reading the image signals in the group. The reading order detection pad 34 is a head detection pad for detecting whether the sensor chip is a sensor chip from which the image signal is read first in the group. Power supply voltage Vcc is supplied to the reading order detection pad 34 as a head detection pad, and the sensor chip 13A detects that the sensor chip is a sensor chip from which the image signal is read first in the group. Similarly, the reading order detection pad 35 is an end detection pad for detecting whether the sensor chip is a sensor chip from which the image signal is read last in the group. The power supply voltage Vcc is supplied to the reading order detection pad 35 as an end detection pad, and the sensor chip 13A detects that the sensor chip is a sensor chip from which the image signal is read last in the group.

The image signal output pad 36 is connected to the common output line and is connected to an output end of a signal output amplifier AMP of the sensor part 32. An image signal output from the signal output amplifier AMP of the sensor part 32 is output to the connected common output line through the image signal output pad 36. The image signal output pads 36 of sensor chips 13A-i1, 13A-i2, and 13A-i3 belonging to an i-th group are commonly connected to one common output line OUTi corresponding to the i-th group.

A start pulse SP for starting the reading operation of the image signal of one scan line is input to the start pulse input pad 37. A clock CLK for driving circuits in the sensor chip 13A is input to the clock input pad 38. To synchronize the operation of the sensor chips 13A, the start pulse input pads 37 of the sensor chips 13A are commonly connected to one signal line for supplying the start pulse SP, and the clock input pads 38 are commonly connected to one signal line for supplying the clock CLK.

A signal for notifying the end of the reading of the image signal from the sensor chip 13A is output from the next chip start signal output pad 39. The next chip start signal output pad 39 is connected to the start signal input pad 33 of the sensor chip 13A that reads the image signal next in the same group. More specifically, in the second and subsequent sensor chips 13A in the reading order of image signals, the signal for notifying the end of the reading of the image signal output from the next chip start signal output pad 39 of the previous sensor chip 13A in the reading order is used as the start signal SI for starting the reading of the image signal.

The pad part 31A includes a pad, not illustrated, connected to power supply voltage (VCC) and reference potential (GND). The pads described above are examples, and the pad part 31A may include a mode signal input pad for setting the resolution, for example.

Figure 5:
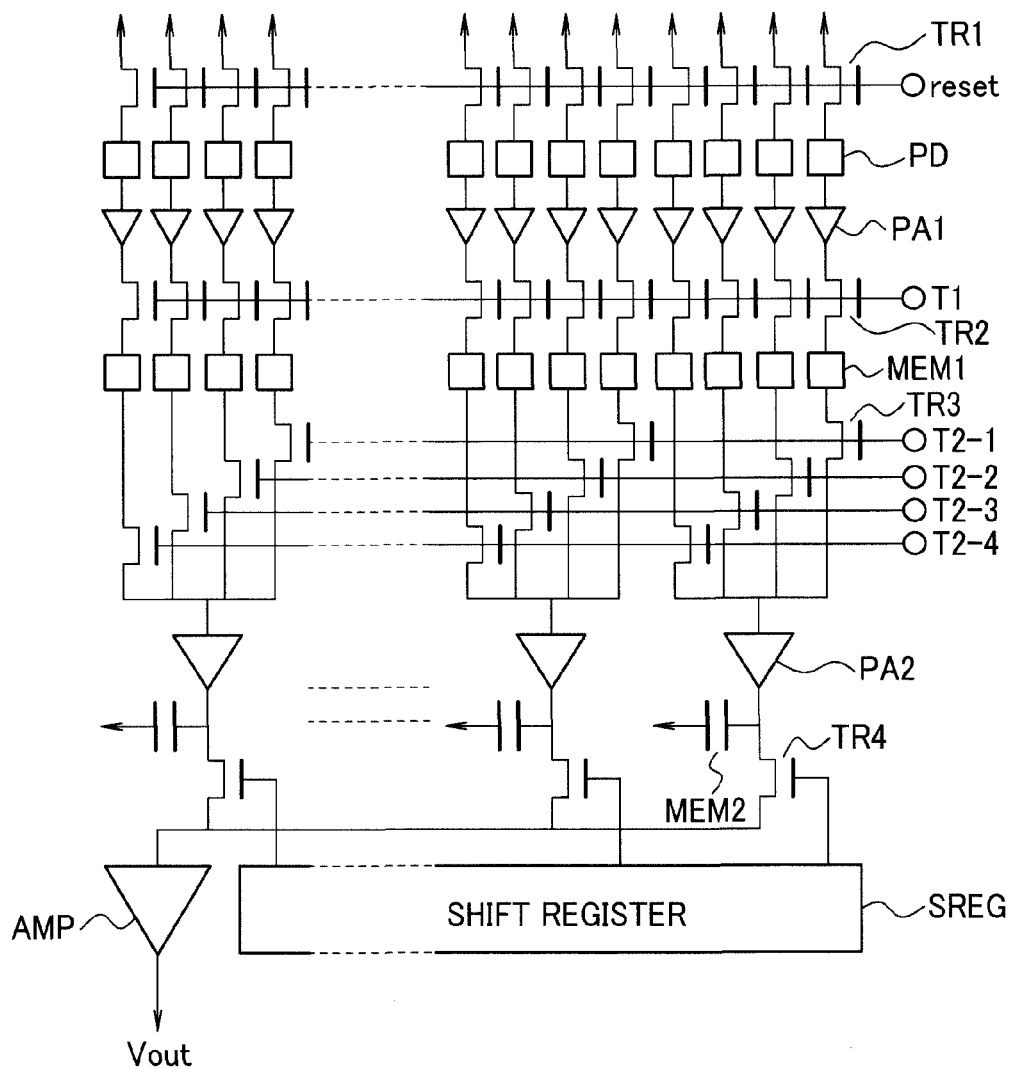
FIG. 5 is a view illustrating an example of a circuit configuration of a sensor part in the sensor chip according to the first embodiment.

As illustrated in FIG. 5, the sensor part 32 includes: photodiodes PD as photoelectric conversion elements; transistors TR1, TR2, TR3, and TR4; amplifiers PA1 and PA2; analog memories MEM1 and MEM2 as memory parts; a shift register SREG; and a signal output amplifier AMP. The photodiodes PD are photoelectric conversion elements that convert the reflected light focused by the rod-lens array 12 to electric signals, as described above. The photodiodes PD are arranged at predetermined intervals in the same direction as the longitudinal direction of the light guide 11.

The transistors TR1 are reset transistors for resetting the photodiodes PD as the photoelectric conversion elements. The transistors TR1 control conduction/non-conduction (ON/OFF) by signals "reset". The transistors TR2 are first transfer transistors for reading the image signals obtained by the photoelectric conversion from the photodiodes PD. The transistors TR2 control conduction/non-conduction (ON/OFF) by signals T1. The image signals read from the photodiodes PD are held in the first analog memories MEM1 through the amplifiers PA1 and the first transfer transistors TR2.

The transistors TR3 are second transfer transistors for transferring the image signals held in the first analog memories MEM1 to the second analog memories MEM2. The transistors TR3 control conduction/non-conduction (ON/OFF) by signals T2. The image signals held in the first analog memories MEM1 are transferred through the second transfer transistors TR3 and the amplifiers PA2 and held in the second analog memories MEM2.

The transistors TR4 are reading transistors for reading the image signals held in the second analog memories MEM2. The transistors TR4 control conduction/non-conduction (ON/OFF) based on output of the shift register SREG. The transistors TR4 are turned on one by one according to the output of the shift register SREG, and the image signals held in the second analog memories MEM2 are sequentially read. The image signals are amplified by the signal output amplifier AMP and output as signal output Vout.

The signal output amplifier AMP amplifies the input image signals and outputs the signal output Vout to the common output line. In the present embodiment, ON/OFF of the signal output amplifier AMP is controlled according to the operation state of the sensor chip 13A. For example, power is supplied to the signal output amplifier AMP to turn on the signal output amplifier AMP. The power supply to the signal output amplifier AMP is cut off, or a reduced state of current consumption (low current consumption state) is set, to turn off the signal output amplifier AMP.

Figure 6:
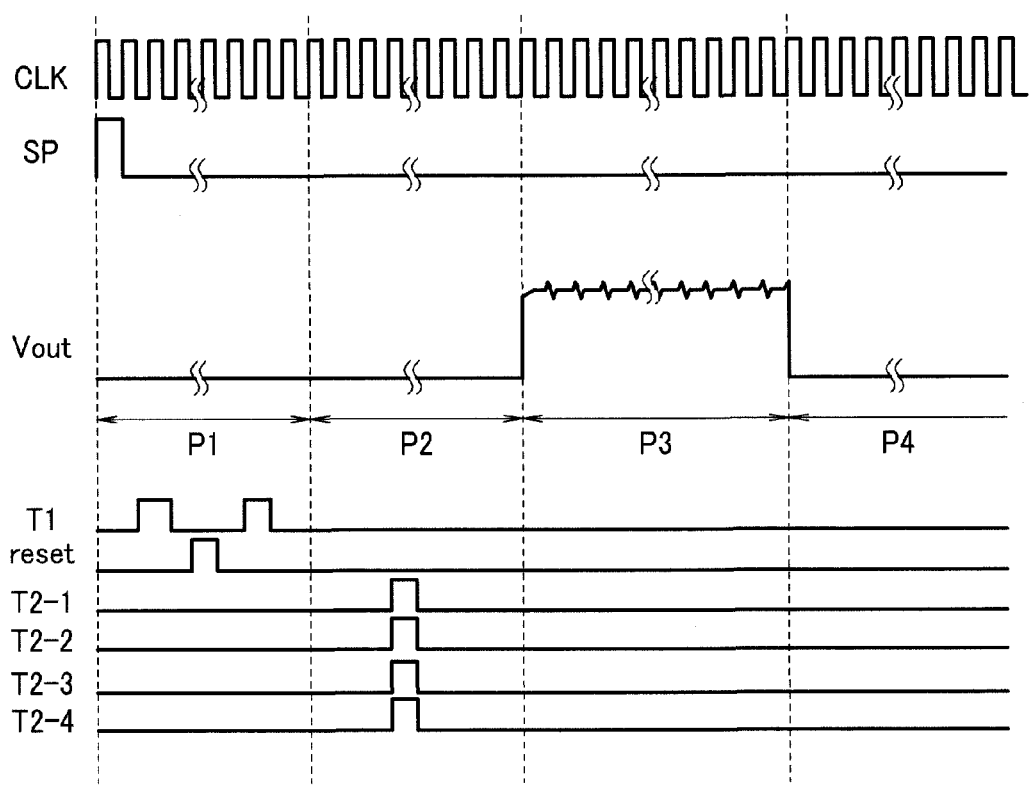
FIG. 6 is a timing chart illustrating an example of operation of the sensor chip according to the first embodiment.

FIG. 6 is a timing chart illustrating an example of operation of the sensor chip 13A. In a period P1, when the start pulse SP is input to the sensor chip 13A, the signal "reset" is input after the signal T1 is input, and the photodiodes PD as the photoelectric conversion elements are reset. After a predetermined period from the input of the signal "reset", the signal T1 is input to read the image signals obtained by the photoelectric conversion from the photodiodes PD. The image signals read from the photodiodes PD are transferred through the amplifiers PA1 and the first transfer transistors TR2 and held in the first analog memories MEM1.

In a period P2, the signals T2 are input, and the image signals held in the first analog memories MEM1 transferred through the second transfer are transistors TR3 and the amplifiers PA2 and held in the second analog memories MEM2. FIG. 6 illustrates an example of obtaining one image datum by 4-pixel addition in a so-called low resolution mode, and all of the signals T2-1 to T2-4 are input at the same timing.

In the following period P3, the reading transistors TR4 are sequentially turned on according to the output of the shift register SREG. As a result, the image signals held in the second analog memories MEM2 are sequentially read, and effective image signals are output as the signal output Vout through the signal output amplifier AMP. There is a blanking period P4 when the reading of the image signals from the sensor chip 13A is finished.

Figure 7A:
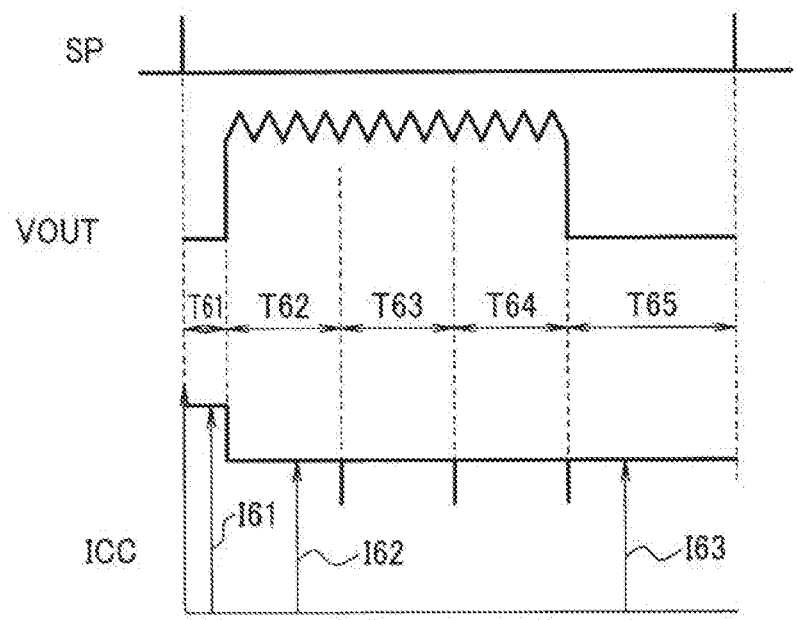
FIG. 7A is a diagram for describing output voltage and current consumption of the image sensor unit according to the first embodiment.
Figure 7B:
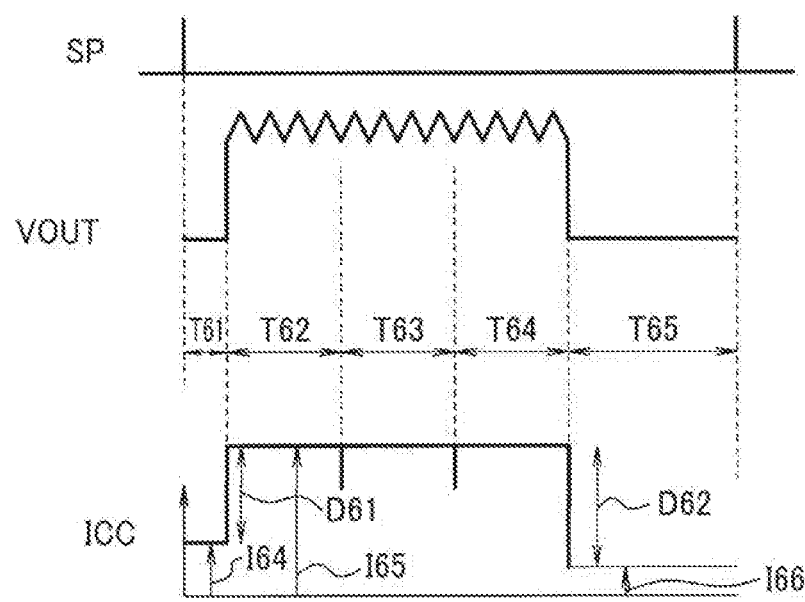
FIG. 7B is a view illustrating the output voltage and the current consumption of an image sensor unit in a conventional control method.

Operation of the image sensor unit 5 in the first embodiment will be described. FIG. 7A is a diagram for describing output voltage VOUT and current consumption ICC of the image sensor unit 5 in the first embodiment. FIG. 7B is a diagram illustrating the output voltage VOUT and the current consumption ICC in a conventional control method for comparison with the present embodiment.

The image sensor unit 5 in the first embodiment controls ON/OFF of the signal output amplifier AMP according to the operation state of the sensor chip 13A at the reading operation of the image signal from the image sensor unit 5. Specifically, the signal output amplifier AMP is turned on when the sensor chip 13A starts reading the image signal, and the signal output amplifier AMP is turned off when the reading of the image signal is finished. Power is supplied to the signal output amplifier AMP to turn on the signal output amplifier AMP, for example, and the power supply to the signal output amplifier AMP is cut off to turn off the signal output amplifier AMP, for example.

However, in the sensor chip 13A in which the power supply voltage Vcc is supplied to the head detection pad 34 and from which the image signal is read first in the group, the signal output amplifier AMP is immediately turned on when input of the start pulse SP is detected. In the sensor chip 13A in which the power supply voltage Vcc is supplied to the end detection pad 35 and from which the image signal is read last in the group, the signal output amplifier AMP is not turned off when the reading of the image signal is finished, and the signal output amplifier AMP is turned on until input of the next start pulse is detected.

Therefore, in the sensor chip 13A from which the image signal is read first in the group, the signal output amplifier AMP is turned on in a period from the detection of the input of the start pulse SP to the end of the reading of the image signal from the sensor chip. In the sensor chip 13A from which the image signal is read last in the group, the signal output amplifier AMP is turned on in a period from the start of the reading of the image signal from the sensor chip to the detection of the input of the start pulse SP. In the other sensor chips 13A, the signal output amplifiers AMP are turned on in a reading period of image signal that is a period from the start to the end of the reading of the image signal from the sensor chip.

As illustrated in FIG. 4, an example of reading image signals by grouping the plurality of sensor chips 13A mounted on the image sensor unit 5, each set including three sensor chips 13A-i1, 13A-i2, and 13A-i3, will be described.

When the start pulse SP is input, all sensor chips 13A of the image sensor unit 5 perform vertical transfer operation, and the signal output amplifier AMP is turned on in the sensor chip 13A-i1 from which the image signal is read first in the group (period T61). In the period T61, the signal output amplifiers AMP are turned off in the sensor chips 13A-i2 and 13A-i3 other than the sensor chip 13A-i1 from which the image signal is read first in the group. Therefore, in the period T61, current consumption I61, which is a sum of the current consumption in the vertical transfer operation by all sensor chips and the current consumption of the signal output amplifiers AMP of the same number of sensor chips as the number of groups, is the current consumption of the image sensor unit 5.

When the start signal SI is input to the sensor chip 13A-i1 from which the image signal is read first in the group, reading of the image signal from the sensor chip 13A-i1 is started, and the output VOUT according to the image signal is sequentially output (period T62). In the period T62, the signal output amplifiers AMP of the sensor chips 13A-i2 and 13A-i3 are turned off. Therefore, in the period T62, current consumption I62 of the signal output amplifiers AMP of the same number of sensor chips as the number of groups is the current consumption of the image sensor unit 5.

A signal for notifying the end of the reading of the image signal is output from the sensor chip 13A-i1, and the signal is input to the sensor chip 13A-i2 that reads the image signal next. As a result, the signal output amplifier AMP is turned on in the sensor chip 13A-i2, reading of the image signal from the sensor chip 13A-i2 is started, and the output VOUT according to the image signal is sequentially output (period T63). In the period T63, the signal output amplifiers AMP of the sensor chips 13A-i1 and 13A-i3 are turned off. Therefore, in the period T63, the current consumption of the signal output amplifiers AMP of the same number of sensor chips as the number of groups, that is, the same amount of current as the current consumption I62, is the current consumption of the image sensor unit 5.

Subsequently, a signal for notifying the end of the reading of the image signal is output from the sensor chip 13A-i2, and the signal is input to the sensor chip 13A-i3 that reads the image signal next. As a result, the signal output amplifier AMP is turned on in the sensor chip 13A-i3, reading of the image signal from the sensor chip 13A-i3 is started, and the output VOUT according to the image signal is sequentially output (period T64). In the period T64, the signal output amplifiers AMP of the sensor chips 13A-i1 and 13A-i2 are turned off. Therefore, in the period T64, the current consumption of the signal output amplifiers AMP of the same number of sensor chips as the number of groups, that is, the same amount of current as the current consumption I62, is the current consumption of the image sensor unit 5.

When the reading of the image signal from the sensor chip 13A-i3 is finished, there is a blank period until the start pulse SP for starting the operation of the next line is input (period T65). In the period T65, the signal output amplifier AMP of the sensor chip 13A-i3 is turned on. More specifically, in the period T65, the same state as the period T64 is maintained, the signal output amplifier AMP of the sensor chip 13A-i3 is turned on, and the signal output amplifiers AMP of the sensor chips 13A-i1 and 13A-i2 are turned off. Therefore, in the period T65, current consumption I63 of the signal output amplifiers AMP of the same number of sensor chips as the number of groups is the current consumption of the image sensor unit 5. The current consumption I63 is current similar to the current consumption I62 as is clear from the description above. The blank period is finished when the start pulse SP for starting the operation of the next line is input, and reading of the image signal of the next line is started as in the period T61.

According to the first embodiment, the plurality of sensor chips 13A mounted on the image sensor unit 5 are divided into a plurality of groups, the image signals are concurrently read in the groups, and ON/OFF of the signal output amplifiers AMP is controlled according to the operation state of the sensor chip 13A. As a result, only the signal output amplifier AMP of one sensor chip 13A in the group is turned on, and the signal output amplifiers AMP of the other sensor chips 13A in the group are turned off. This can reduce the current consumption of the image sensor unit 5. For example, compared to when the signal output amplifiers AMP are always turned on without controlling ON/OFF of the signal output amplifiers AMP according to the operation state of the sensor chips 13A, the current consumption of the image sensor unit 5 can be reduced to about (1/the number of chips in the group).

In the first embodiment, the signal output amplifier AMP of one sensor chip 13A in the group is turned on in the vertical transfer operation period and the blank period in the reading operation of the image signal from the image sensor unit 5. As a result, the number of operations by the signal output amplifiers AMP at the reading operation of the image signal from the image sensor unit 5 is always constant. The variation in the current consumption of the image sensor unit 5 can be reduced without arranging additional circuits, and the variation in the power supply voltage can be reduced without increasing the area or the cost. If the operation speed of the sensor chips is increased, the current consumption of the signal output amplifiers tends to increase in order to secure the band. Therefore, it is effective to apply the technique in the present embodiment to a high-speed image sensor.

For example, when FIGS. 7A and 7B are compared, the variation in the current consumption of the image sensor unit 5 between the period T61 as a vertical transfer operation period and the period T62 as an image signal reading period of the sensor chip 13A-i1 is an amount of current equivalent to the current consumption in the vertical transfer operation by all sensor chips according to the present embodiment. On the other hand, in the conventional method of turning off all signal output amplifiers in the vertical transfer operation, the amount of variation in the current consumption of the image sensor unit 5 is a difference D61 between current consumption I64 in the vertical transfer operation by all sensor chips and current consumption I65 of the signal output amplifiers of the same number of sensor chips as the number of groups, and the different D61 is large. The current consumption of the image sensor unit 5 does not change between the period T64 as an image signal reading period of the sensor chip 13A-i3 and the period T65 as a blank period, because the number of operated signal output amplifiers does not change according to the first embodiment. On the other hand, in the conventional method of turning off all signal output amplifiers in the blank period, the amount of variation in the current consumption of the image sensor unit 5 is a difference D62 between current consumption 165 of the signal output amplifiers of the same number of sensor chips as the number of groups and current consumption 166 by idle current of all sensor chips, and the difference D62 is significantly large. In this way, according to the first embodiment, the variation in the current consumption of the image sensor unit 5 can be reduced without arranging additional circuits, and the variation in the power supply voltage can be reduced without increasing the area or the cost.

Second Embodiment

A second embodiment of the present invention will be described.

In the first embodiment, the signal output amplifier AMP of one of the sensor chips 13A in the group is always turned on to reduce the variation in the current consumption of the image sensor unit 5. In the second embodiment described below, each group includes a current consumption circuit that consumes current equivalent to the current consumption of one signal output amplifier AMP. In the vertical transfer operation period and the blank period in the reading operation of the image signal from the image sensor unit 5, the current consumption circuit consumes the current to reduce the variation in the current consumption of the image sensor unit 5. In the following description of the second embodiment, differences from the first embodiment will be described, and other parts similar to the first embodiment will not be described.

FIG. 8 is a view illustrating an example of the sensor chips 13B and a current consumption circuit 70 mounted on the sensor substrate 14 according to the second embodiment. In FIG. 8, constituent elements with the same functions as the constituent elements illustrated in FIG. 4 are designated with the same reference numerals, and the description will not be repeated. In FIG. 8, the sensor chips 13B (13B-11, 13B-12, 13B-13, 13B-21, . . . ) are sensor chips mounted on the sensor substrate 14. Each sensor chip 13B includes photoelectric conversion elements. A plurality of sensor chips 13B are mounted in a line in the same direction as the longitudinal direction of the light guide 11 as described above, and the sensor chips 13B form the photoelectric conversion part 13. A current consumption circuit 70 is controlled to consume current D62' equivalent to the current consumption of one signal output amplifier AMP.

In the second embodiment, three sensor chips 13B also form one set, and the plurality of mounted sensor chips 13B are grouped. Image signals are concurrently read in the groups. A sensor chip 13B-ij (i and j are suffixes) reads the image signal in an i-th group and in a j-th order. Image signal output pads of the sensor chips 13B belonging to the same group are commonly connected to one of the common output lines outside of the sensor chips that are signal output lines for outputting the image signals. The number of sensor chips 13B forming one set is arbitrary, and the number can be appropriately set according to, for example, an external interface of the image sensor unit 5 or specifications of reading time. The sensor chips 13B are mounted on the sensor substrate 14 to even out the intervals between the photoelectric conversion elements in the plurality of sensor chips 13B.

Each of the sensor chips 13B includes: a pad part 31B including a plurality of pads for transmitting and receiving signals to and from the outside of the sensor chip; and a sensor part 32. The pad part 31B is different from the pad part 31A of the first embodiment in that the reading order detection pad 35 is not included. The next chip start signal output pad 39 is connected to the start signal input pad 33 of the sensor chip 13B that reads the image signal next in the same group, as in the first embodiment. However, the next chip start signal output pad 39 of the sensor chip 13B from which the image signal is read last in the group is connected to the current consumption circuit 70.

The current consumption circuit 70 is arranged for each group of the sensor chips 13B. The current consumption circuit 70 includes an RS flip-flop 71, a switch (transistor) 72, and a resistance 73. An input S of the RS flip-flop 71 is connected to the next chip start signal output pad 39 of the sensor chip 13B from which the image signal is read last in the group, and a signal for notifying the end of the reading of the image signal output from the next chip start signal output pad 39 is supplied. A start signal SI for starting the reading of the image signal input to the start signal input pad 33 of the sensor chip 13B, or a signal equivalent to the start signal SI, is supplied to an input R of the RS flip-flop 71.

A series circuit including the switch 72 and the resistance 73 connected in series is connected between the power and the ground. An output Q of the RS flip-flop 71 controls conduction/non-conduction (ON/OFF) of the switch 72. The characteristics of the elements forming the current consumption circuit 70 are set so that the current D62' flows through the series circuit including the switch 72 and the resistance 73 when the switch 72 is turned on. According to the configuration, in a period from the input of a signal to the input S of the RS flip-flop to the input of a signal to the input R of the RS flip-flop 71, the output of the RS flip-flop 71 is asserted to turn on the switch 72, and the current consumption circuit 70 consumes the current D62'.

Figure 9:
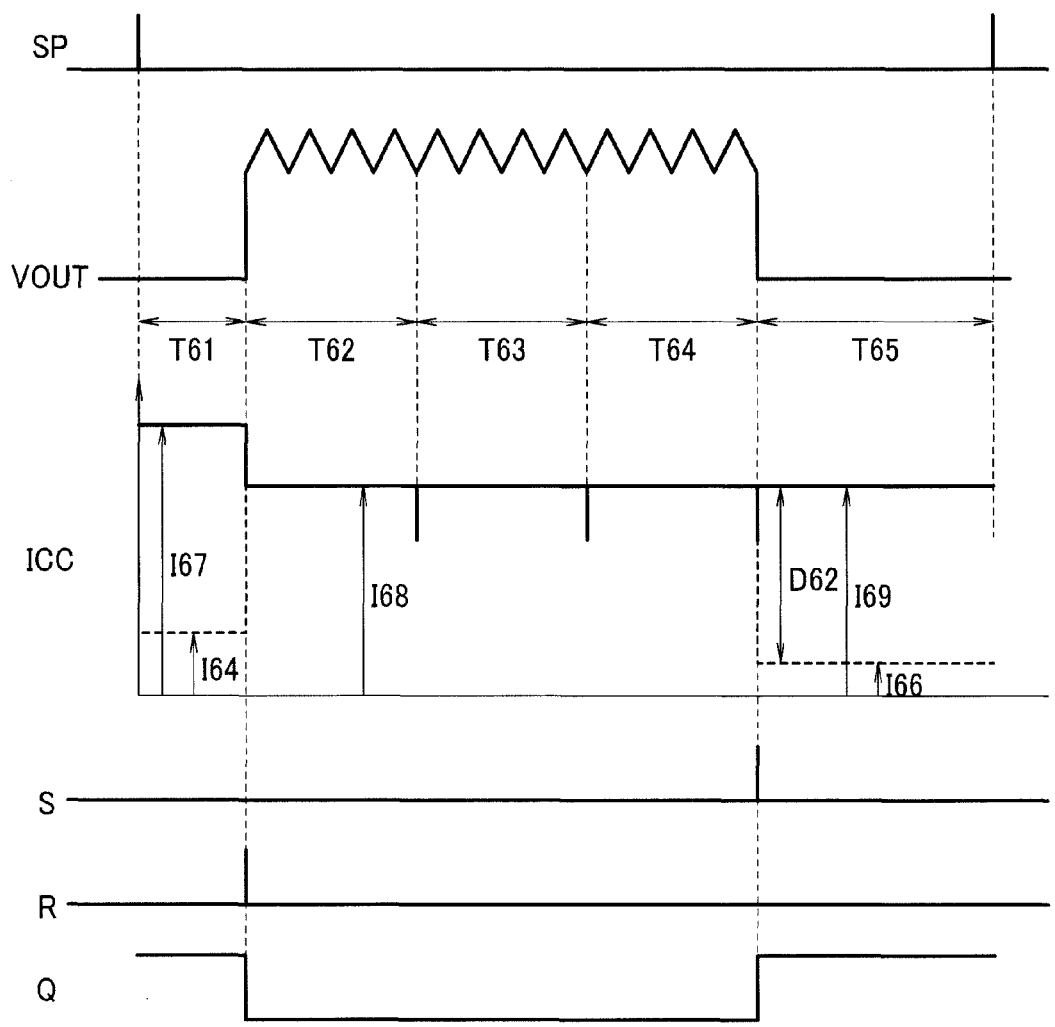
FIG. 9 is a diagram for describing the output voltage and the current consumption of the image sensor unit according to the second embodiment.

Operation of the image sensor unit 5 according to the second embodiment will be described. FIG. 9 is a diagram for describing the output voltage VOUT and the current consumption ICC of the image sensor unit 5 according to the second embodiment. In the image sensor unit 5 according to the second embodiment, ON/OFF of the signal output amplifier AMP is controlled according to the operation state of the sensor chip 13B at the reading operation of the image signal from the image sensor unit 5. Specifically, the signal output amplifier AMP is turned on when the sensor chip 13B starts reading the image signal, and the signal output amplifier AMP is turned off when the reading of the image signal is finished. Hereinafter, an example of reading image signals by grouping the plurality of sensor chips 13B mounted on the image sensor unit 5, each set including three sensor chips 13B-i1, 13B-i2, and 13B-i3, will be described.

When the start pulse SP is input, all sensor chips 13B of the image sensor unit 5 perform the vertical transfer operation (period T61). In the period T61, the signal output amplifiers AMP of all sensor chips 13B are turned off. In this case, the output Q is asserted in the RS flip-flop 71 of the current consumption circuit 70 as the signal is input to the input S at the end of the reading of the image signal in the previous line. Therefore, the switch 72 is turned on, and the current consumption circuit 70 consumes current D62. The current D62 is (the current D62'×the number of groups). As a result, in the period T61, current consumption I67, which is obtained by adding the current consumption D62 of the same number of current consumption circuits 70 as the number of groups to the current consumption I64 in the vertical transfer operation by all sensor chips, is the current consumption of the image sensor unit 5.

When the start signal SI is input to the sensor chip 13B-i1 from which the image signal is read first in the group, the reading of the image signal from the sensor chip 13B-i1 is started, and the output VOUT according to the image signal is sequentially output (period T62). In the period T62, the signal output amplifiers AMP of the sensor chips 13B-i2 and 13B-i3 are turned off. At the same time as the input of the start signal SI to the sensor chip 13B-i1, the output Q is negated by inputting a signal to the input R in the RS flip-flop 71 of the current consumption circuit 70, and the switch 72 is turned off. Therefore, in the period T62, current consumption I68 of the signal output amplifiers AMP of the same number of sensor chips as the number of groups is the current consumption of the image sensor unit 5.

In the following periods T63 and T64, the signal output amplifier AMP is turned on and the image signal is read in each case of only the sensor chip 13B-i2 and only the sensor chip 13B-i3, as in the first embodiment. Therefore, in the periods T63 and T64, the current consumption of the signal output amplifiers AMP of the same number of sensor chips as the number of groups, that is, the same amount of current as the current consumption I68, is the current consumption of the image sensor unit 5.

When the reading of the image signal from the sensor chip 13B-i3 is finished, there is a blank period until the start pulse SP for starting the operation of the next line is input (period T65). In the period T65, the signal output amplifiers AMP of all sensor chips 13B are turned off. When the reading of the image signal from the sensor chip 13B-i3 is finished, a signal is input to the input S of the RS flip-flop 71 of the current consumption circuit 70, and the output Q is asserted. Therefore, the switch 72 is turned on, and the current consumption circuit 70 consumes the current D62. As a result, in the period T65, current consumption I69, which is obtained by adding the current consumption D62 of the same number of current consumption circuits 70 as the number of groups to the current consumption I66 by the idle current of all sensor chips, is the current consumption of the image sensor unit 5. When the start pulse SP for starting the operation of the next line is input, the blank period is finished, and reading of the image signal of the next line is started as in the period T61.

According to the second embodiment, the plurality of sensor chips 13B mounted on the image sensor unit 5 are divided into a plurality of groups, the image signals are concurrently read in the groups, and ON/OFF of the signal output amplifiers AMP is controlled according to the operation state of the sensor chip 13B. As a result, only the signal output amplifier AMP of one sensor chip 13B in the group is turned on, and the signal output amplifiers AMP of the other sensor chips 13B in the group are turned off. This can reduce the current consumption of the image sensor unit 5.

In the second embodiment, the current consumption circuit 70 consumes predetermined current in the vertical transfer operation period and the blank period in the reading operation of the image signal from the image sensor unit 5 in which the signal output amplifiers AMP of all sensor chips 13B are turned off. As a result, the variation in the current consumption of the image sensor unit 5 can be reduced, and the variation in the power supply voltage can be reduced. If the operation speed of the sensor chips is increased, the current consumption of the signal output amplifiers tends to increase in order to secure the band. Therefore, it is effective to apply the technique in the present embodiment to a high-speed image sensor.

The image sensor unit 5 according to the present embodiment can be applied to an image reading apparatus or an image forming apparatus, such as an image scanner, a facsimile, and a copying machine.

According to the present invention, the variation in the current consumption of the image sensor unit in the ON/OFF control of the signal output parts of the sensor chips can be reduced, and the variation in the power supply voltage can be reduced.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

What is claimed is:

1. An image sensor unit comprising:
    a plurality of sensor chips mounted in a line on a same substrate, each of the plurality of sensor chips including a signal output amplifier configured to output image signals, during a reading period, to an external output line; and
    a current consumption circuit that consumes a set current in a predetermined period, a magnitude of the set current being set based on a magnitude of a current consumption of one signal output amplifier of one of the plurality of sensor chips during the reading period,
    each of the plurality of sensor chips comprising:
    a plurality of photoelectric conversion elements that convert reflected light from an imaged illuminated object to electric signals;
    a memory part that holds the image signals obtained from photoelectric conversion by the photoelectric conversion elements; and
    a signal output part that outputs the image signals sequentially read from the memory part to the external output line, wherein ON/OFF of the signal output part is controlled according to an operation state of the sensor chip,
    wherein the predetermined period in which the current consumption circuit consumes the set current begins in response to a signal indicating an end of all reading periods of all of the plurality of sensor chips and ends in response to a signal indicating a start of the reading period of a first sensor chip among the plurality of sensor chips in response to a start signal.

2. The image sensor unit according to claim 1, wherein the current consumption circuit is arranged for each group of the sensor chips including output pads of the image signals commonly connected to the same external output line.

3. The image sensor unit according to claim 1, wherein the sensor chips including the output pads of the image signals commonly connected to the external output line form one group, and ON/OFF of the signal output parts of the sensor chips is controlled according to a reading order of the image signals among the sensor chips in the group.

4. The image sensor unit according to claim 3, wherein the image signals from the sensor chips are concurrently read in each group.

5. The image sensor unit according to claim 1, wherein the signal output part comprises a signal output amplifier that amplifies the image signals read from the memory part to output the image signals to the external output line.

6. The image sensor unit according to claim 1, wherein the magnitude of the set current is set to be equivalent to the magnitude of the current consumption of the one signal output amplifier of the one of the plurality of sensor chips.

7. An image sensor unit comprising a plurality of sensor chips mounted in a line on a same substrate,
    each of the plurality of sensor chips configured to output image signals, during a reading period, to an external output line, and each of the plurality of sensor chips comprising:

a plurality of photoelectric conversion elements that convert reflected light from an imaged illuminated object to electric signals;

a memory part that holds the image signals obtained from photoelectric conversion by the photoelectric conversion elements;

a signal output part that outputs the image signals sequentially read from the memory part to the external output line, wherein ON/OFF of the signal output part is controlled according to an operation state of the sensor chip; and order detection pads supplied with voltage according to a reading order of the image signals among the sensor chips, wherein the second and subsequent sensor chips in the reading order of the image signals among the sensor chips start the reading period in response to a signal for notifying an end of the reading period of the previous sensor chip in the reading order, the sensor chip that is first in the reading order of the image signals based on the voltage supplied to the order detection pads turns on the signal output part in the reading period starting from detection of an input of a start pulse for starting an operation for one scan line to an end of the reading period of the sensor chip, the sensor chip that is last in the reading order of the image signals based on the voltage supplied to the order detection pads turns on the signal output part from a start of the reading period of the sensor chip until the sensor chip that is first in the reading order detects an input of the next start pulse, and the sensor chip that is not first and not last in the reading order of the image signals based on the voltage supplied to the order detection pads turns on the signal output part in the reading period of the sensor chip.

8. The image sensor unit according to claim 7, wherein the order detection pads comprise: a first pad supplied with predetermined voltage when the reading order of the image signals is first; and a second pad supplied with predetermined voltage when the reading order of the image signals is last.

9. The image sensor unit according to claim 7, wherein the sensor chips including the output pads of the image signals commonly connected to the external output line form one group, and ON/OFF of the signal output parts of the sensor chips is controlled according to a reading order of the image signals among the sensor chips in the group.

10. The image sensor unit according to claim 9, wherein the image signals from the sensor chips are concurrently read in each group.

11. The image sensor unit according to claim 7, wherein the signal output part comprises a signal output amplifier that amplifies the image signals read from the memory part to output the image signals to the external output line.

12. An image sensor unit comprising:

a substrate;

a current consumption circuit disposed on the substrate and configured to consume a current during a period; and a plurality of sensor chips mounted in a line on the substrate, each of the plurality of sensor chips comprising:

a plurality of photoelectric conversion elements that convert reflected light from an imaged illuminated object to electric signals;

a memory part that holds image signals obtained from photoelectric conversion by the photoelectric conversion elements; and a signal output part that outputs the image signals sequentially read from the memory part to an external output line, wherein ON/OFF of the signal output part is controlled according to an operation state of the sensor chip, wherein a first group of sensor chips among the plurality of sensor chips comprises a first sensor chip and a second sensor chip, a next chip start signal output pad of the first sensor chip is connected to a start signal input pad of another sensor chip of the first group of sensor chips, and a next chip start signal output pad of the second sensor chip is connected to an input of the current consumption circuit such that the current consumption circuit receives a signal output from the next chip start signal output pad of the second sensor chip.

13. The image sensor unit according to claim 12, wherein the current consumption circuit comprises a flip-flop, a switch, and a resistor, and the next chip start signal output pad of the second sensor chip is connected to an input terminal of the flip-flop.

14. The image sensor unit according to claim 13, wherein the plurality of sensor chips comprise at least two groups of sensor chips, and one current consumption circuit only is provided for each of the at least two groups of sensor chips.

* * * * *